Aug. 25, 1959 R. G. STACY 2,901,059
ENCLOSED DUAL-DISK BRAKES FOR VEHICLES
Filed May 16, 1957
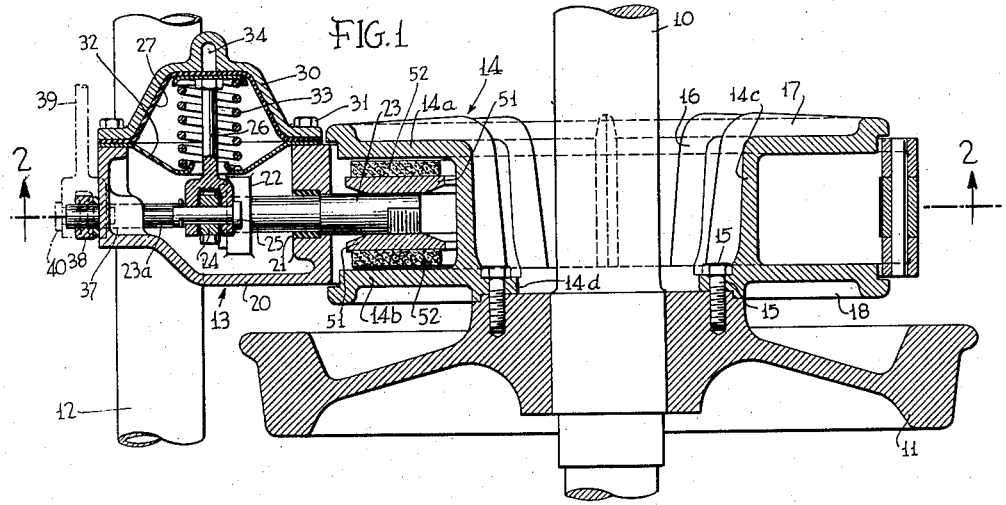
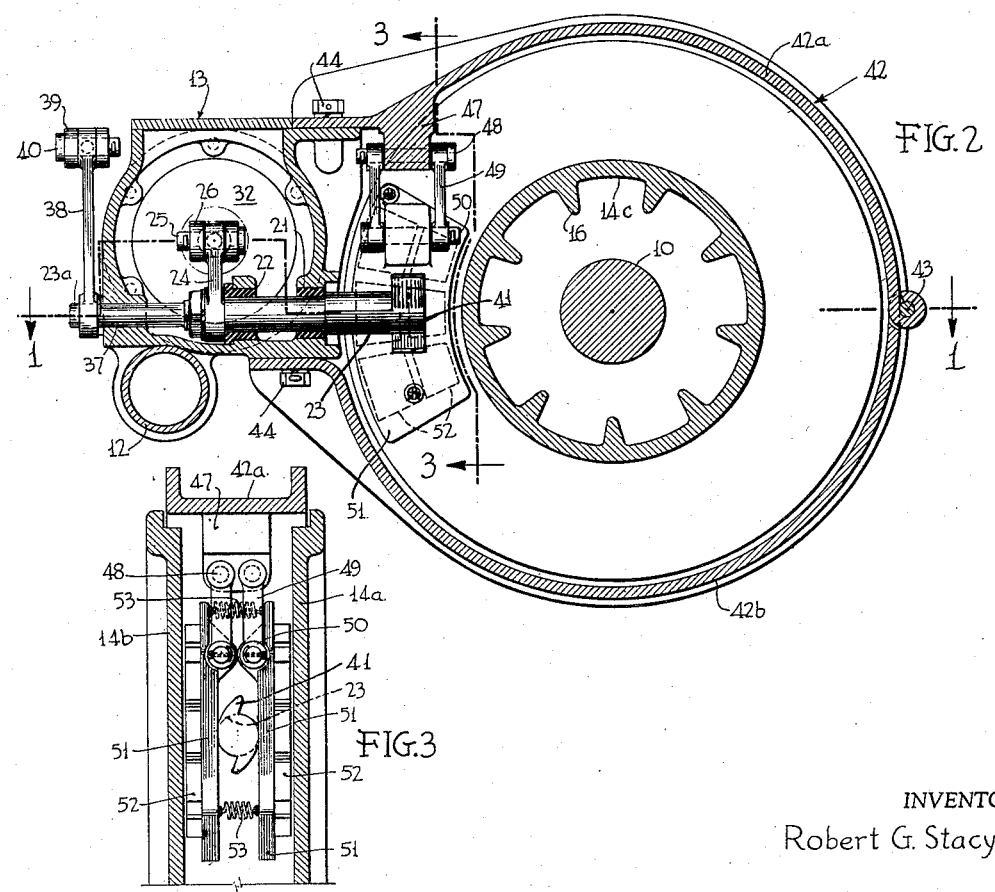
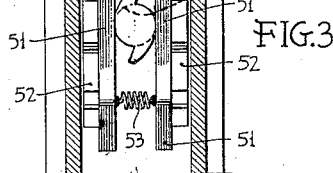
INVENTOR
Robert G. Stacy
BY
Wm. R. Glisson
ATTORNEY United States Patent Office 2,901,059
Patented Aug. 25, 1959

2,901,059

ENCLOSED DUAL-DISK BRAKES FOR VEHICLES

Robert G. Stacy, Jenkintown, Pa., assignor to The Budd Company, Philadelphia, Pa., a corporation of Pennsylvania Application May 16, 1957, Serial No. 659,673

3 Claims. (Cl. 188—73)

This invention relates to enclosed dual-disk brakes for vehicles, especially for railway cars, and has for an object the provision of improvements in this art. The present invention is an improvement on that disclosed in my copending application, Serial No. 584,973, filed May 15, 1956, now Patent Number 2,848,072, issued August 19, 1958.

One of the particular objects of the invention is to provide outside-mounted operator type segmental disk brakes in which the braking surfaces are fully enclosed to exclude snow and water and which will still have adequate outside exposed cooling surfaces.

Another object is to provide an enclosure which is mounted on the brake operating unit carried by the vehicle truck and which fully encloses the space between two axially spaced brake disks mounted on the axle of a wheel-axle unit.

Another object is to provide an enclosure of the character described which can be quickly opened or removed for access to the brakes.

Another object is to provide a cam operated brake in which there is no retentive connection between the brake shoes and the cam operator so that ready separation may be effected.

Another object is to provide an improved mounting for the brake shoes on the enclosing casing which provides for removal of the brake shoes with the casing.

Another object is to provide a simple shaft operator for the brake shoes such that the shaft has simple turning movement and can be easily sealed at its bearings.

Another object is to provide an operating arrangement which is adapted to use simple handbrake connections.

Another object is to provide a design which occupies minimum space.

Another object is to provide brake mechanism which is easy and inexpensive to manufacture and which will give long and satisfactory service.

The above and other objects of the invention as well as various advantages will be apparent from the following description of an exemplary embodiment wherein:

Fig. 1 is a horizontal section along the axis of a wheel-axle unit, the view being taken on the line 1—1 of Fig. 2;

Fig. 2 is a vertical longitudinal section taken on the line 2—2 of Fig. 1; and

Fig. 3 is a partial vertical transverse section taken on the line 3—3 of Fig. 2.

The brake unit is shown in connection with a wheel-axle unit for a truck of a railway car. It is not necessary to show the entire truck assembly or even a complete wheel-axle unit but there is shown an axle 10 and a wheel 11 of a wheel-axle unit and a frame-supported brake beam 12 on which the brake operating units are mounted, one such brake operating assembly is designated as a unit by the numeral 13.

Adjacent a wheel 11 there is mounted a dual-disk unit 14 comprising axially spaced disks 14a, 14b and an interior hollow hub portion 14c on which the disks are carried. The disk unit may be made in separate parts or as an integral casting, as shown. The hub portion is provided with an interior radial flange 14d having suitable holes for cap bolts 15 by which it is secured to the hub of the wheel.

Cooling and rigidifying ribs 16, 17 and 18 are provided on the hollow hub portion 14c, the disk 14a and the disk 14b, respectively.

The brake operating unit 13 includes a hollow housing 20 which is secured to the brake beam 12 in any suitable way, as by welding as indicated. Bearings 21, 22 carried by the housing support a cam shaft 23 which is disposed generally radially to the axle 10 and between the disks 14a, 14b.

A power operating arm 24 is mounted on the cam shaft within the casing and to this arm there is connected, as by a pivot pin 25, an operating rod 26 which at its other end is connected to a suitable power device, such as a flexible rubber-like diaphragm 27. A cupped head 30, secured to the casing 20 as by cap bolts 31, secures the periphery of the diaphragm to the casing and also secures an oppositely cupped head 32 to the casing. A coil spring 33 seated on the inner head 32 around the flanged opening for the rod 26 urges the diaphragm 27 toward the head 30. The head 30 is provided with a port 34 for pressure fluid for forcing the diaphragm in the opposite direction.

An extension 23a of the shaft 23 extends out of the casing 20 through a bearing 37 and exteriorly has secured thereon an arm 38 for mechanical manual operation. An operating link 39 is connected to the arm 38, as by a pivot pin 40.

At its inner end the cam shaft 23 carries a brake shoe operating cam 41, here shown as comprising two opposite cam elements.

A cover 42 encloses the space between the disks 14a, 14b and has a sealed turning fit with peripheries of the disks, either by a simple labyrinth seal as shown, by a more elaborate labyrinth seal, or by a packing joint seal, or both, in known manner. The spacing from the disks or the flexibility of the cover and related parts, or both, take care of any relative movement between disks and cover due to road weave.

The cover is made in two parts 42a, 42b hinged together by a pivot pin 43 and each part is secured to the housing 20 by cap bolts 44.

The upper cover part 42a, above the cam 41, is provided with an interior projection 47 supporting pins 48 carrying links 49 which, through pivot pins 50, support brake shoes 51 having non-metallic composition lining segments 52. Springs 53 keep the brakes clear of the disks until pressed outward by the cam. As shown, there are six lining segments for each shoe.

The active parts of the brake are completely covered, yet the external cooling ribs cause air to circulate rapidly to cool the disk braking surfaces.

The cam shaft mounting provides a simple, inexpensively manufactured arrangement, and the non-attached relationship of the brake cam and brake shoes provides a quickly assembled arrangement.

The cam shaft, by simple extension provides a convenient arrangement for mechanical operation of the brakes.

The mounting of the brake shoes on the upper half of the casing permits them to be quickly removed and replaced, as for inspection, repair or replacement.

While one embodiment of the invention has been disclosed by way of illustration, it is to be understood that there may be various modifications and embodiments within the scope of the invention.

What is claimed is:

1. A disk brake assembly for rail vehicles comprising in combination, a supporting axle, a pair of axially spaced rotatable brake disks secured on the axle, said disks having axially spaced opposed facing braking surfaces, a brake shoe operating assembly mounted in a fixed position at one side of the axle beyond the periphery of the disks, said operating assembly including a turnable brake shoe operating cam shaft disposed radially of the cam shaft with its inner cam end disposed between said brake disks, and means for turning said cam shaft about its axis, a cover carried by said operating assembly and enclosing the disks and the space between them to exclude snow, water and the like, axially spreadable brake shoes supported by said cover between said disks for engaging the opposed faces of the disks, and a turnable cam on said cam shaft between said brake shoes for actuating them, supporting means for the brake shoes being at one side of said cam shaft and arranged for the shoes to move in the direction toward their said supporting means past the cam when lifted with the cover to provide quick removal of the shoes from the assembly and disks.

2. A disk brake assembly for rail vehicles comprising in combination, a supporting axle, a pair of axially spaced rotatable brake disks secured on the axle, said disks having axially spaced opposed facing braking surfaces, a brake shoe operating assembly mounted in a fixed position at one side of the axle beyond the periphery of the disks, said operating assembly including a turnable brake shoe operating cam shaft disposed radially of the cam shaft with its inner cam end disposed between said brake disks, and means for turning said cam shaft about its axis, a cover carried by said operating assembly and enclosing the disks and the space between them to exclude snow, water and the like, axially spreadable brake shoes supported by said cover between said disks for engaging the opposed faces of the disks, and a turnable cam on said cam shaft between said brake shoes for actuating them, supporting means for the brake shoes being at one side of said cam shaft and arranged for the shoes to move in the direction toward their said supporting means past the cam when lifted with the cover to provide quick removal of the shoes from the assembly and disks, said casing being divided transversely and comprising an upper part and a lower part, the upper part of the casing carrying said means for supporting said shoes in the form of suspension elements on opposite sides of said cam.

3. A disk brake assembly for rail vehicles comprising in combination, a supporting axle, a pair of axially spaced rotatable brake disks secured on the axle, said disks having axially spaced opposed facing braking surfaces, a brake shoe operating assembly mounted in a fixed position at one side of the axle beyond the periphery of the disks, said operating assembly including a turnable brake shoe operating cam shaft disposed radially of the cam shaft with its inner cam end disposed between said brake disks, and means for turning said cam shaft about its axis, a cover carried by said operating assembly and enclosing the disks and the space between them to exclude snow, water and the like, axially spreadable brake shoes supported by said cover between said disks for engaging the opposed faces of the disks, and a turnable cam on said cam shaft between said brake shoes for actuating them, supporting means for the brake shoes being at one side of said cam shaft and arranged for the shoes to move in the direction toward their said supporting means past the cam when lifted with the cover to provide quick removal of the shoes from the assembly and disks, said casing being divided transversely and comprising an upper part and a lower part, the upper part of the casing carrying said means for supporting said shoes in the form of suspension elements on opposite sides of said cam, said radially disposed cam shaft having a power operator housing forming a continuation with said cover for the brake shoes and disks, and a hand operating connection for the cam shaft disposed exteriorly of said power operator housing.

References Cited in the file of this patent

UNITED STATES PATENTS

| 162,556 | Howe | Apr. 27, 1875 |
| 1,843,594 | Baker | Feb. 2, 1932 |
| 1,900,282 | Halbach | Mar. 7, 1933 |
| 1,957,668 | Renaux | May 8, 1934 |
| 2,174,406 | Aikman | Sept. 26, 1939 |
| 2,592,536 | Buckendale | Apr. 15, 1952 |

FOREIGN PATENTS

| 707,074 | Germany | June 12, 1941 |